US008886386B2

(12) United States Patent
Merk

(10) Patent No.: US 8,886,386 B2
(45) Date of Patent: Nov. 11, 2014

(54) METHOD FOR WIRELESS COMMUNICATION BETWEEN VEHICLES

(75) Inventor: Stephan Merk, München (DE)

(73) Assignee: Continental Automotive GmbH, Hannover (DE)

( * ) Notice: Subject to any disclaimer, the term of this patent is extended or adjusted under 35 U.S.C. 154(b) by 1244 days.

(21) Appl. No.: 12/516,277

(22) PCT Filed: Nov. 8, 2007

(86) PCT No.: PCT/EP2007/062033
§ 371 (c)(1),
(2), (4) Date: Feb. 23, 2010

(87) PCT Pub. No.: WO2008/061890
PCT Pub. Date: May 29, 2008

(65) Prior Publication Data
US 2012/0095641 A1 Apr. 19, 2012

(30) Foreign Application Priority Data
Nov. 23, 2006 (DE) ......................... 10 2006 055 344

(51) Int. Cl.
*G08G 1/0967* (2006.01)
*G05D 1/00* (2006.01)
*G08G 1/16* (2006.01)

(52) U.S. Cl.
CPC ...................................... *G08G 1/161* (2013.01)
USPC ............................................ 701/28; 340/905

(58) Field of Classification Search
None
See application file for complete search history.

(56) References Cited

U.S. PATENT DOCUMENTS 5,889,477 A * 3/1999 Fastenrath .................... 340/905
6,012,012 A * 1/2000 Fleck et al. ................... 701/117
6,150,961 A * 11/2000 Alewine et al. ............ 340/995.1
6,151,550 A * 11/2000 Nakatani ........................ 701/117
6,178,374 B1 * 1/2001 Mohlenkamp et al. ....... 701/117
6,317,682 B1 * 11/2001 Ogura et al. .................. 701/117
6,339,736 B1 * 1/2002 Moskowitz et al. ......... 701/32.7
6,401,027 B1 * 6/2002 Xu et al. ....................... 701/117
6,459,961 B1 * 10/2002 Obradovich et al. ............. 701/1
6,546,330 B2 * 4/2003 Fushiki et al. ................ 701/118

(Continued)

FOREIGN PATENT DOCUMENTS

DE 2107953 7/1972
DE 19914906 10/2000

(Continued)

OTHER PUBLICATIONS

Translation of German Patent No. DE 19914906, Oct. 5, 2000, Stiller Christopher.*

*Primary Examiner* — Mussa A Shaawat
(74) *Attorney, Agent, or Firm* — Cozen O'Connor

(57) ABSTRACT

The invention relates to a method for wireless communication between vehicles (2, 3), according to which a second vehicle (3) located in relation to a first vehicle (2) is identified by the first vehicle; the second vehicle (3) emits wireless driving information which is received by the first vehicle, the driving information comprising information on the traffic situation in the surroundings of the second vehicle (3) and/or on the state variables of the second vehicle (3); the driving information received in the first vehicle (2) is processed in the first vehicle (2); and the processed driving information is outputted in the first vehicle (2) at least partially by means of an output means.

15 Claims, 2 Drawing Sheets

(56) References Cited

U.S. PATENT DOCUMENTS

| | | | | |
|---|---|---|---|---|
| 6,801,837 | B2 * | 10/2004 | Carlstedt et al. | 701/1 |
| 6,900,739 | B2 * | 5/2005 | Su et al. | 340/904 |
| 7,181,343 | B2 * | 2/2007 | Mukaiyama | 701/400 |
| 7,355,524 | B2 * | 4/2008 | Schofield | 340/903 |
| 7,504,986 | B2 * | 3/2009 | Brandt et al. | 342/70 |
| 7,545,286 | B2 * | 6/2009 | Yanase | 340/905 |
| 8,040,253 | B2 * | 10/2011 | Kaller et al. | 340/903 |
| 2002/0198653 | A1 * | 12/2002 | Lutter | 701/209 |
| 2002/0198658 | A1 | 12/2002 | Lutter | |
| 2003/0125845 | A1 * | 7/2003 | Carlstedt et al. | 701/1 |
| 2003/0160685 | A1 * | 8/2003 | Su et al. | 340/425.5 |
| 2005/0043879 | A1 * | 2/2005 | Desens et al. | 701/96 |
| 2005/0196020 | A1 * | 9/2005 | Comaniciu et al. | 382/104 |
| 2005/0264402 | A1 * | 12/2005 | Boddy et al. | 340/425.5 |
| 2007/0179712 | A1 * | 8/2007 | Brandt et al. | 701/300 |
| 2007/0188347 | A1 * | 8/2007 | Schofield | 340/903 |
| 2008/0174453 | A1 * | 7/2008 | Schofield | 340/933 |
| 2009/0243825 | A1 * | 10/2009 | Schofield | 340/435 |
| 2013/0321615 | A1 * | 12/2013 | Schofield | 348/118 |

FOREIGN PATENT DOCUMENTS

| | | |
|---|---|---|
| DE | 10356500 | 7/2004 |
| DE | 10310501 | 9/2004 |
| DE | 102004008895 | 9/2005 |
| DE | 102004049870 | 4/2006 |
| DE | 102006016807 | * 10/2006 |
| DE | 102006016807 | 10/2007 |
| EP | 1457947 | 9/2004 |
| JP | 8201080 | 8/1996 |
| JP | 2004310425 | 11/2004 |
| JP | 2006107521 | 4/2006 |
| WO | WO 03001474 | 1/2003 |
| WO | WO 2006037360 | 4/2006 |

* cited by examiner

METHOD FOR WIRELESS COMMUNICATION BETWEEN VEHICLES

PRIORITY CLAIM

This is a U.S. national stage of application No. PCT/EP2007/062033, filed on 8 Nov. 2007, which claims Priority to the German Application No: 10 2006 055 344.6, Filed: 23 Nov. 2006; the contents of both which are incorporated here by reference.

BACKGROUND OF THE INVENTION

1. Field of the Invention

The invention relates to a device and method for wireless communication between vehicles.

2. Prior Art

Wireless communication networks are used nowadays in a large number of technical fields. In the field of motor vehicle engineering it is known for vehicles to exchange information with one another via what is referred to as car-2-car communication. This communication involves a wireless ad hoc network which is established between spatially adjacent vehicles in road traffic and is based in technical terms on an advanced WLAN (Wireless Local Area Network) according to IEEE standard 802.11.

In car-2-car communication, a wireless radio link between vehicles is used to transmit the information which is obtained from the sensor system of a vehicle to other vehicles in the vicinity. As a result, information relating to hazardous locations can be transmitted quickly from one vehicle to other vehicles. However, the vehicle which receives this information in a wireless fashion does not specify from which vehicle specific information is received. The methods which are known from the prior art are therefore not suitable for targeted transmission of information from one vehicle to another. In particular, a driver assistance system which assists a driver immediately in a traffic situation which is difficult to comprehend is not provided.

SUMMARY OF THE INVENTION

An object of the invention is therefore to provide a method for wireless communication between vehicles in which immediate and efficient assistance is provided for the driver in traffic situations which are difficult to comprehend.

In the method according to one embodiment of the invention, a second vehicle located in relation to a first vehicle, preferably in front of it, is identified. The identified second vehicle here is, in particular, the vehicle located directly in front of the first vehicle in the direction of travel, i.e. there are preferably no other vehicles arranged between the first and second vehicles. The second vehicle transmits driving information in a wireless fashion and said information is received by the first vehicle, with the driving information comprising information relating to the traffic situation in the surroundings of the second vehicle, preferably in front of the second vehicle, and/or relating to a state variable of the second variable. The first vehicle processes the driving information which is emitted by the identified second vehicle and received in the first vehicle, with the processed driving information being output at least partially via an output means in the first vehicle in such a way that it can be perceived by the driver.

The invention is characterized in that a second vehicle is firstly identified selectively by the first vehicle in accordance with predetermined criteria. After this identification, the information from the corresponding second vehicle is selectively received by the first vehicle, with the result that the information which relates to the second vehicle, which is traveling in front for example, or to the traffic situation in the surroundings of the second vehicle and is relevant to a driver is obtained immediately.

In one preferred embodiment, the wireless communication between the vehicles is carried out over a wireless decentralized ad hoc radio network, in particular over a WLAN, to be precise preferably over a network which is configured for car-2-car communication. Any other desired types of wireless communication between vehicles can also be used. For example, the method described in the document US 2006/0119489 A1, in which information is transmitted using the light sources on the vehicle, for example the rear light.

In a further embodiment of the invention, the identification of the second vehicle is carried out by means of one or more sensors in the first vehicle. In particular, a registration number or registration plate recognition process using a camera, for example a video camera, can be used to identify the second vehicle. In this context, the driving information which is emitted by the second vehicle contains the information as to what the registration number of the second vehicle is. This ensures that the first vehicle can unambiguously identify the received information to determine whether the information is that of the second vehicle identified by means of the registration number.

In a further preferred embodiment of the invention, the identification of the second vehicle is determined by exchanging position data, in particular position data acquired via GPS (Global Positioning System), between vehicles which are involved in the wireless communication.

In a further embodiment of the invention, the driving information which is output in the first vehicle via the output means is information relating to possible overtaking of the second vehicle by the first vehicle. This provides effective assistance to the driver of the first vehicle during the overtaking process. In this context, if the information relating to possible overtaking of the second vehicle by the first vehicle indicates that overtaking is not possible, an automated intervention into the driving behavior of the driver of the first vehicle can take place, if said driver would like to begin an overtaking process or has already begun one. This intervention can be, for example, an intervention into the steering of the first vehicle or prevention of acceleration of the first vehicle. In this way the driver of the first vehicle can be protected against dangerous overtaking processes being carried out.

The information relating to possible overtaking of the second vehicle by the first vehicle comprises here, in particular, the relative velocity of the second vehicle in relation to the next vehicle which is traveling ahead and/or is oncoming and/or the size of the gap between the second vehicle and the next vehicle which is traveling ahead and/or the estimated duration of an overtaking maneuver. In this way, the significant problems which occur during an overtaking process can be overcome or alleviated. In particular, the overtaking driver of the first vehicle is provided with information about the oncoming traffic which he often can discern only with great difficulty owing to the large height of the vehicle to be overtaken. Furthermore, the overtaking driver of the first vehicle is provided with an estimate of how long the overtaking process will be expected to last. This estimate can often only be performed very imprecisely by the overtaking driver. Furthermore, the overtaking driver of the first vehicle is provided, by means of the gap size, with information which indicates whether a further vehicle is located very close in front of the second vehicle so that, under certain circumstances, it is not possible to cut back in to the lane after the overtaking process. This information is in a usual situation often not available to an overtaking driver since when the vehicle to be overtaken is excessively high it is not possible to see the size of the gap from the next vehicle in front of the vehicle to be overtaken.

In a further variant of the invention, the information relating to possible overtaking of the second vehicle by the first vehicle can also take into account information of the first vehicle, in particular the power of the engine and/or the acceleration capacity of the first vehicle. The lower the power of the engine and/or the acceleration capacity of the first vehicle, the more time is allowed in the calculation for the overtaking process so that in vehicles with a relatively low power of the engine and acceleration capability a signal is often output which indicates that the overtaking process is not possible. Furthermore, weather conditions such as wet road, ice, and the like can also be taken into account in the information relating to possible overtaking, in which case the weather conditions may be sensed, for example, by a corresponding sensor (for example temperature sensor).

In a further, particularly preferred embodiment of the method, the second vehicle acquires the driving information relating to variables via one or more sensors. The sensors may comprise, for example, a video camera. The video image which is captured by the video camera is preferably emitted here by the second vehicle and received in the first vehicle and processed in such a way that the video image is displayed on a display means in the first vehicle.

Additionally or alternatively, the video image which is captured by the video camera and which is received in the first vehicle can also be processed in such a way that driving information which indicates whether it is possible for the second vehicle to be overtaken by the first vehicle is obtained from the video image by computation, wherein the driving information which is obtained by computation in the first vehicle is output as an optical and/or acoustic and/or haptic message via the output means. Haptic message is to be understood here and in the text which follows as meaning a message which is conveyed by touch and/or can be perceived mechanically. In particular, it may be a vibration signal which is output in such a way that it can be perceived by the driver of the first vehicle. However, it is also possible for driving information to be acquired immediately in the second vehicle from the video image which is captured by the video camera, with this driving information indicating whether it is possible for the second vehicle to be overtaken by the first vehicle, with this driving information being output as an optical and/or acoustic and/or haptic message via the output means after the reception and the processing in the first vehicle. This variant of the invention has the advantage that it is not necessary for the entire video image information to be transmitted but rather only the information relating to the overtaking process. This reduces the data transfer during the wireless communication.

In a further embodiment of the invention, the one or more sensors of the second vehicle comprise one or more radar sensors and/or lidar (light detection and ranging) sensors for measuring distance and/or measuring velocity of vehicles which are traveling ahead and/or oncoming. In addition, the sensors can also comprise vehicle sensors, in particular speedometers and/or accelerometers and/or GPS sensors which acquire state variables of the second vehicle.

The measurement data of the radar sensor or sensors and/or lidar sensor or sensors and/or the vehicle sensor or sensors as driving information are preferably emitted by the second vehicle and received in the first vehicle, wherein processed driving information is obtained by computation from the received driving information, said processed driving information indicating whether it is possible for the second vehicle to be overtaken by the first vehicle, with the driving information which is obtained by computation in the first vehicle being output as an optical and/or acoustic and/or haptic message via the output means. However, it is also possible for the measurement data to be already converted into relevant driving information before the emission. In this case, driving information is obtained from the measurement data of the radar sensor or sensors and/or lidar sensor or sensors and/or the vehicle sensor or sensors in the second vehicle, said driving information indicating whether it is possible for the second vehicle to be overtaken by the first vehicle, with this driving information being output as an optical and/or acoustic and/or haptic message via the output means after the reception and the processing in the first vehicle.

In a further preferred embodiment of the invention, communication takes place between the first and second vehicles at least whenever the second vehicle exceeds predetermined dimensions, and is in particular a truck. This ensures that a corresponding communication is triggered whenever the field of vision of the first vehicle is restricted.

In addition to the method described above, the invention also relates to a device for performing wireless communication between vehicles, comprising:

- an identification means which can be integrated into a first vehicle, for identifying a second vehicle located in relation to the first vehicle;
- a receiving means which can be integrated into the first vehicle, for receiving driving information which is emitted in a wireless fashion by the identified second vehicle, wherein the driving information comprises information relating to the traffic situation in the surroundings of the second vehicle and/or relating to state variables of the second vehicle;
- a processing means which can be integrated into the first vehicle, for processing the driving information which is received by the first vehicle;
- an output means which can be integrated into the first vehicle, for outputting at least some of the driving information which is processed in the processing means.

BRIEF DESCRIPTION OF THE DRAWINGS

Exemplary embodiments of the invention are described in detail below with reference to the appended figures, of which.

DETAILED DESCRIPTION OF THE DRAWINGS

In the text which follows, the communication method according to the invention is explained with reference to the communication between a passenger car and a truck, with the passenger car constituting the first vehicle in the sense of the claims and the truck constituting the second vehicle in the sense of the claims.

Figure 1:
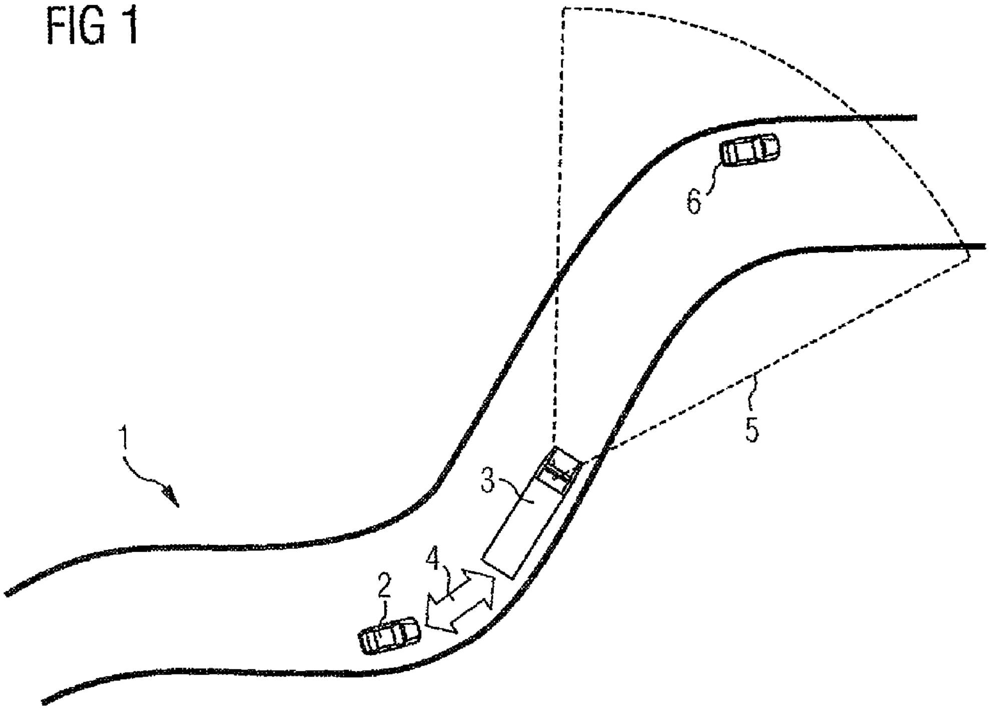
FIG. 1 is a schematic illustration in which the inventive communication method according to a first embodiment of the invention is clarified.

FIG. 1 is a plan view from above of a scenario on a road 1 on which a passenger car 2 and a truck 3 are located. The truck

3 is here the vehicle which is traveling directly ahead in front of the passenger car. The two vehicles 2 and 3 are equipped with corresponding transmitting and receiving means for car-2-car communication. That is to say the two vehicles can exchange data over a local radio link via corresponding antennae. In this context, what is referred to as an ad hoc network is established between vehicles which are in radio range of one another. This means that each vehicle can communicate with another vehicle in its range or can communicate through the intermediary of other vehicles with a router function. The radio communication between vehicle 2 and vehicle 3 is indicated here schematically by the double arrow 4.

In the variant of the invention described here, the wireless communication between vehicle 2 and vehicle 3 will be used to ensure that information indicating whether the traffic situation or the instantaneous travel data of the vehicle 3 permit overtaking of this vehicle by the vehicle 2 is transmitted to the vehicle 2. This information is very helpful to the driver of the vehicle 2 since due to the size of the truck 3 he cannot see the traffic situation in front of the truck.

In the scenario in FIG. 1, the truck 3 has a video camera which is mounted, for example, behind the interior mirror in the passenger compartment of the truck. The video camera has a viewing angle 5 which is represented by dashed lines in FIG. 1. According to one embodiment of the invention, the field of vision which is covered by the video camera is now transmitted from the truck 3 to the passenger car 2 via the wireless communication link 4. In order to permit such a transmission, according to the invention a corresponding identification means, with which it is identified that the truck 3 is the vehicle which is traveling directly ahead in front of the passenger car 2, is used in the vehicle 2. This identification can be carried out in any desired way. One possibility is that the passenger car 2 also has a video camera which captures a field of vision in front of the passenger car, with the rear registration plate of the truck 3 which is traveling ahead being identified on the image which is taken. The number of the registration plate is also contained here in the communication messages which are emitted by the truck 3, so that the passenger car 2 can identify the communication messages which originate from the truck 3. Methods for identifying the registration number of vehicles are known from the prior art in this context (see, for example, DE 199 14 906 A1).

The determination as to which vehicle is the vehicle traveling ahead in front of the passenger car 2 can, if appropriate, also be carried out by calculating relative positions using the GPS coordinates which are exchanged in the ad hoc network. This the variant can then be used if the vehicles which are involved in communication all have a corresponding GPS locating system. The identification of the vehicle traveling ahead can be carried out here, for example, in such a way that the passenger car 2 determines its direction of movement from its own GPS position data, and then determines therefrom which vehicle is the next vehicle which is located in the direction of movement in front of the passenger car 2. Methods for calculating the relative positions of vehicles with respect to one another are adequately known from the prior art. For example, reference is made to documents JP 8201080 A, JP 2004310425 and JP 2006107521 A.

After the vehicle 2 has identified the truck 3 which is traveling directly ahead of it, in the embodiment according to FIG. 1, the video images which are recorded by the truck 3 are transmitted to the passenger car 2 via the communication path 4. The passenger car has here a combination instrument which contains a display unit on which the field of vision 5 of the video camera is represented after corresponding processing. In this way, the driver in the passenger car 2 can view the space in front of the truck 3 and he can judge whether a process for overtaking the lorry is possible. In the scenario in FIG. 1, the driver of the passenger car 2 can recognize that an oncoming vehicle 6 is located in the field of vision of the truck so that an overtaking process is not appropriate. The above method can, if appropriate, also be carried out with a night vision camera which can take an image of the surroundings in front of the truck 3 in the dark using close-range infrared or thermal imaging. The images of the night vision device can be transmitted here to the passenger car 2 in a way which is analogous to that for the video camera.

In one refinement it is also possible that an image analysis of the recorded video images is already carried out in the truck 3, in which case the image analysis determines whether an overtaking process is possible. As a result, in the case of FIG. 1 it would be determined that such a process is not possible owing to the oncoming passenger car 6. A corresponding message with this information would subsequently be transmitted to the passenger car 2. Since such a message requires significantly less storage space than a video image, less bandwidth is required for the communication path 4. The information that no overtaking process is possible can then in turn be displayed in the passenger car 2 using a corresponding display means in the passenger car. If appropriate, it is also possible that the information is not represented optically via a display means but rather that a corresponding voice message is generated which is output via a loudspeaker in the passenger compartment of the passenger car. It is also possible to trigger either a voice message or a corresponding display on the display means.

Figure 2:
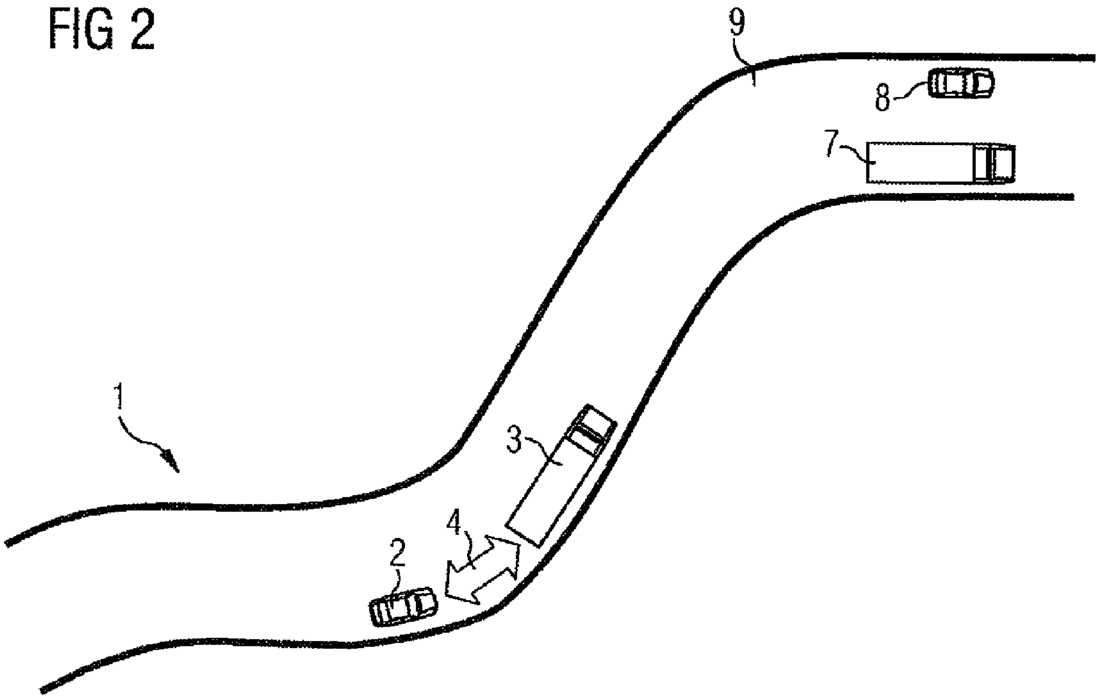
FIG. 2 is a schematic illustration in which the inventive communication method according to a second embodiment of the invention is clarified.

FIG. 2 shows a scenario similar to that in FIG. 1. In particular, there is the same situation in which the passenger car 2 would like to overtake a truck 3 which is traveling ahead on the road 1. In a way which is analogous to FIG. 1, the truck 3 which is traveling ahead is in turn identified using a corresponding identification means in the passenger car 2. Communication then subsequently takes place again likewise over a corresponding communication path 4 between the passenger car and truck. The judgment as to whether an overtaking process is possible then does not, however, take place using a video camera but rather using sensors which sense the state of the truck 3. In particular, in this context the velocity of the truck 3 is taken into account. This velocity is determined in every truck so that it can be represented on the tachometer for the driver. There are therefore no additional sensors required. Furthermore, the truck 3 can also have a GPS sensor with which the acceleration or velocity of the truck can also be determined by identifying the position at various times.

The length of the truck is also stored in the truck 3. Furthermore, the permitted maximum velocity on the road 1 is known in the truck. This maximum velocity may be extracted, for example, by means of map information which is stored in the truck. Owing to the stored length of the truck and on the basis of the sensed, current velocity as well as the permitted maximum velocity it is possible for the truck 3 to calculate the minimum time which is necessary to overtake the truck. This information is then transmitted to the following passenger car 2 via the communication path 4 and output there, if appropriate after further processing. In particular, an overtaking recommendation can be determined in the truck 3 or in the passenger car 2 from the information relating to the length of the truck, the current velocity and the maximum velocity, and said overtaking recommendation is then conveyed optically or acoustically to the driver of the passenger car 2 via a corresponding output means.

In the situation according to FIG. 2, the vehicles 7 and 8 are located behind a right-handed bend 9 and therefore cannot be seen by the driver of the passenger car 2. By using the information indicating how long the overtaking process will take, the driver of the passenger car 2 can then estimate at the start of the overtaking process whether he can still finish the overtaking process in good time even if oncoming traffic appears from the bend 9.

Figure 3:
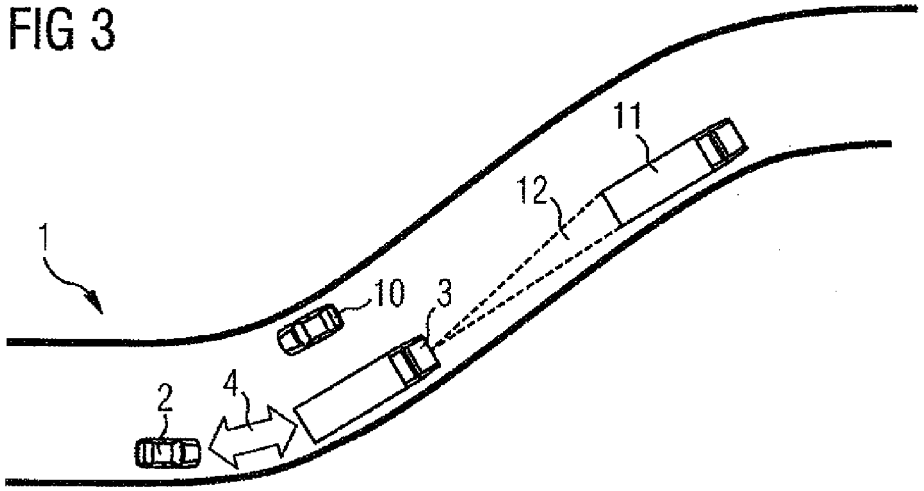
FIG. 3 is a schematic illustration in which the inventive communication method according to a third embodiment of the invention is clarified.

FIG. 3 shows a further traffic situation by means of which a third embodiment of the method according to the invention is explained. Similarly to FIG. 1 and FIG. 2, a passenger car 2 is traveling behind a truck 3 on a road 1. The passenger car has identified the truck 3 traveling ahead using a corresponding identification means, and a corresponding communication occurs over the communication path 4 between the passenger car 2 and truck 3. In the scenario in FIG. 3, an oncoming passenger car 10 is currently passing by the truck 3, and a further truck 11 is traveling in front of the truck 3. The truck 3 has here a radar sensor or lidar sensor whose range is indicated by the dashed triangle 12 in FIG. 3. By using the radar sensor system or the lidar sensor system, the truck 3 can determine whether a further vehicle is located in front of it and how large the distance and the relative velocity of the truck 3 are with respect to this vehicle traveling ahead.

In the example in FIG. 3, the truck 3 recognizes that a truck 11 at a certain velocity is located in front of it. This information can in turn be transmitted via the communication path 4 to the passenger car 2, and it is conditioned to form information relating to a possible overtaking process for the driver of the passenger car 2. The conditioning of this information can already take place here in the truck 3 or only in the passenger car 2. The conditioned information which is determined may be, in particular, whether the gap between the truck 11 and truck 3 is large enough for the passenger car 2 to be able to cut back in to the gap after the overtaking process has ended. If the viewing angle of the radar sensor or lidar sensor is relatively large, it is also possible to determine whether a vehicle is approaching on the oncoming lane and the velocity of this vehicle. As a result, similarly to FIG. 1, it is possible to use such a sensor to judge whether or not an overtaking process is possible owing to oncoming traffic, too.

In principle, the solutions described above according to FIG. 1 to FIG. 3 can be used as alternatives or else in combination. In particular, the truck 3 could have both a video camera and a radar sensor/lidar sensor, from whose measurement data relevant information is then determined for the overtaking process and transmitted to the passenger car 2. Furthermore, the solutions described above are not just restricted to an overtaking process of a truck by a passenger car. They can analogously also be applied to the scenario "truck overtakes truck" or "passenger car overtakes passenger car (in particular relatively large passenger car)".

As is apparent from the preceding description, the embodiments according to FIG. 1 to FIG. 3 are distinguished by the fact that the car-2-car communication, which is known per se, is combined with a sensor system in such a way that the vehicle traveling immediately ahead provides a driver with information relating to the traffic situation in front of said vehicle which is traveling ahead. A driver assistance system is therefore provided with which, in particular, dangerous overtaking of trucks is made easier and safer.

Figure 4:
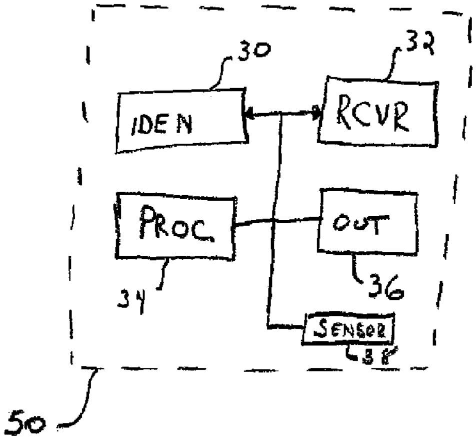
FIG. 4 is a device according to one embodiment of the invention.

FIG. 4 is a device 50 for performing wireless communication between vehicles. The device includes an identifier 30 integrated into a first vehicle configured to identify a second vehicle located in relation to the first vehicle. A receiver 32 is integrated into the first vehicle configured to receive driving information transmitted by the identified second vehicle, the driving information comprising at least a video image captured by a video camera. A processor 34 integrated into the first vehicle is configured to process the driving information to indicate whether it is possible for the second vehicle to be overtaken by the first vehicle. An output device 36 provides at least one of an acoustic output device, and a haptic output device relating to indicate whether it is possible for the second vehicle to be overtaken by the first vehicle. Sensor 38 provide at least one of engine power, acceleration capacity, and current weather conditions.

The invention claimed is:

1. A method for wireless communication between vehicles comprising:

identifying by a first vehicle a second vehicle located in relation to the first vehicle;

acquiring, by the second vehicle, variables relating to driving information via one or more sensors, the one or more sensors comprising at least one video camera;

wirelessly transmitting the variables relating to driving information by the second vehicle, the variables relating to driving information comprising a video image captured by the at least one video camera;

receiving by the first vehicle the transmitted variables;

processing by the first vehicle the transmitted variables to obtain driving information from the video image relating to overtaking the second vehicle by the first vehicle, said information indicating whether it is possible for the second vehicle to be overtaken by the first vehicle; and outputting in the first vehicle the driving information as at least one of an optical signal, an acoustic signal, and a haptic message via an output means, wherein the driving information relating to possible overtaking of the second vehicle by the first vehicle is based in part on information relating to the first vehicle comprising at least one of power of the engine of the first vehicle, acceleration capacity of the first vehicle, and information relating to a current weather condition.

2. The method according to claim 1, wherein the wireless transmission between the vehicles is carried out over a wireless decentralized ad hoc radio network, in particular over a WLAN.

3. The method according to claim 1, wherein one or more sensors in the first vehicle perform the identification of the second vehicle.

4. The method according to claim 3, in which the identification of the second vehicle is carried out by a registration number recognition process using a video camera in the first vehicle, wherein driving information emitted by the second vehicle contains the registration number of the second vehicle.

5. The method according to claim 3, wherein the identification of the second vehicle is determined by exchanging GPS position data, between the first and second vehicles involved in the wireless communication.

6. The method according to claim 1, further comprising:

determining, based at least in part on the driving information, that an overtaking maneuver of the second vehicle by the first vehicle is not possible; and at least one of preventing or aborting the overtaking in an automated fashion.

7. The method according to claim 1, wherein the driving information relating to possible overtaking of the second vehicle by the first vehicle comprises at least one of:

relative velocity of the second vehicle in relation to a next vehicle that is one of traveling ahead of the second vehicle and is oncoming;

a size of a gap between the second vehicle and the next vehicle that is traveling ahead of the second vehicle; and an estimated duration of an overtaking maneuver.

8. The method according to claim 1, further comprising:

processing the video image received in the first vehicle; and displaying the video image on a display in the first vehicle.

9. The method according to claim 1, wherein the one or more sensors further comprise one or more radar and lidar sensors configured for measuring at least one of distance and velocity of vehicles which are traveling ahead and oncoming.

10. The method according to claim 1, wherein the one or more sensors further comprise vehicle sensors configured to acquire state variables of the second vehicle.

11. The method according to claim 1, wherein communication occurs between the first and second vehicles at least whenever the second vehicle exceeds predetermined dimensions.

12. The method according to claim 2, wherein the ad hoc network is a WLAN.

13. The method according to claim 6, wherein the preventing or aborting the overtaking in an automated fashion is accomplished by at least one of an automated intervention into a steering of the first vehicle and an automated prevention of acceleration of the first vehicle.

14. The method according to claim 10 wherein the vehicle sensors are one or more of speedometers, accelerometers, and GPS sensors.

15. A device for performing wireless communication between vehicles, comprising:

an identifier integrated into a first vehicle configured to identify a second vehicle located in relation to the first vehicle;

a receiver integrated into the first vehicle configured to receive variables relating to driving information transmitted by the identified second vehicle, the driving information comprising at least a video image captured by a video camera;

a processor integrated into the first vehicle configured to process the transmitted variables to obtain driving information to indicate whether it is possible for the second vehicle to be overtaken by the first vehicle; and an output device integrated into the first vehicle, the output device being at least one of:

an optical output device, an acoustic output device, and a haptic output device, wherein the driving information which indicates whether it is possible for the second vehicle to be overtaken by the first vehicle is output by the output device, and wherein the indication whether it is possible for the second vehicle to be overtaken by the first vehicle is based in part on information relating to the first vehicle comprising at least one of engine power of the first vehicle, acceleration capacity of the first vehicle, and current weather conditions.

* * * * *